United States Patent [19]
Anderson

[11] Patent Number: 5,600,388
[45] Date of Patent: *Feb. 4, 1997

[54] METHOD AND APPARATUS FOR CREATING CYLINDRICAL THREE DIMENSIONAL PICTURE

[75] Inventor: Victor G. Anderson, Arlington, Tex.

[73] Assignee: Pinnacle Brands, Inc., Grand Prairie, Tex.

[ * ] Notice: The term of this patent shall not extend beyond the expiration date of Pat. No. 5,365,294.

[21] Appl. No.: 195,194

[22] Filed: Feb. 14, 1994

Related U.S. Application Data

[63] Continuation-in-part of Ser. No. 2,969, Jan. 11, 1993, Pat. No. 5,365,294.
[51] Int. Cl.⁶ .................................................. G03B 35/00
[52] U.S. Cl. ............................................ 396/324; 352/58
[58] Field of Search .................................. 352/53, 58, 81, 352/101; 354/110, 112, 80, 292, 115; 355/22

[56] References Cited

U.S. PATENT DOCUMENTS

| | | | |
|---|---|---|---|
| 4,089,597 | 5/1978 | Collender | 352/53 |
| 4,158,487 | 6/1979 | Collender | 352/38 |
| 4,349,252 | 9/1982 | Collender | 352/58 |
| 4,547,050 | 10/1985 | Collender | 352/43 |
| 4,740,073 | 4/1988 | Meacham | 352/58 |
| 5,365,294 | 11/1994 | Anderson | 354/112 |

*Primary Examiner*—Safet Metjahic
*Assistant Examiner*—Nicholas J. Tuccillo
*Attorney, Agent, or Firm*—Baker & Botts, L.L.P.

[57] ABSTRACT

A cylindrical three dimensional picture capable of being viewed through an angle of 360° includes a cylinder surrounded by a photograph, in turn surrounded by a lenticular lens or parallax barrier strip. The photograph is made from a photo emulsion that is exposed and subsequently developed for viewing. The photo emulsion is exposed to the subject, or images of the subject, through the lenticular lens or parallax barrier strip.

19 Claims, 6 Drawing Sheets

PARALLEL RAYS FROM PROJECTED IMAGE

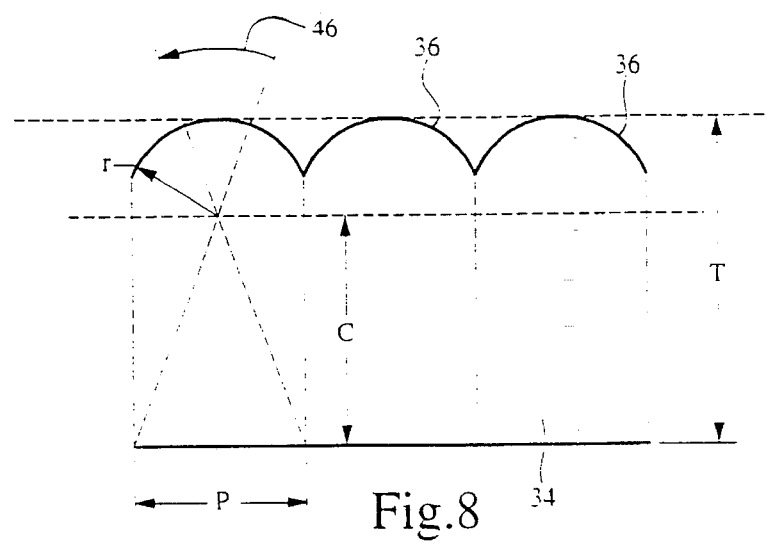
Fig.8
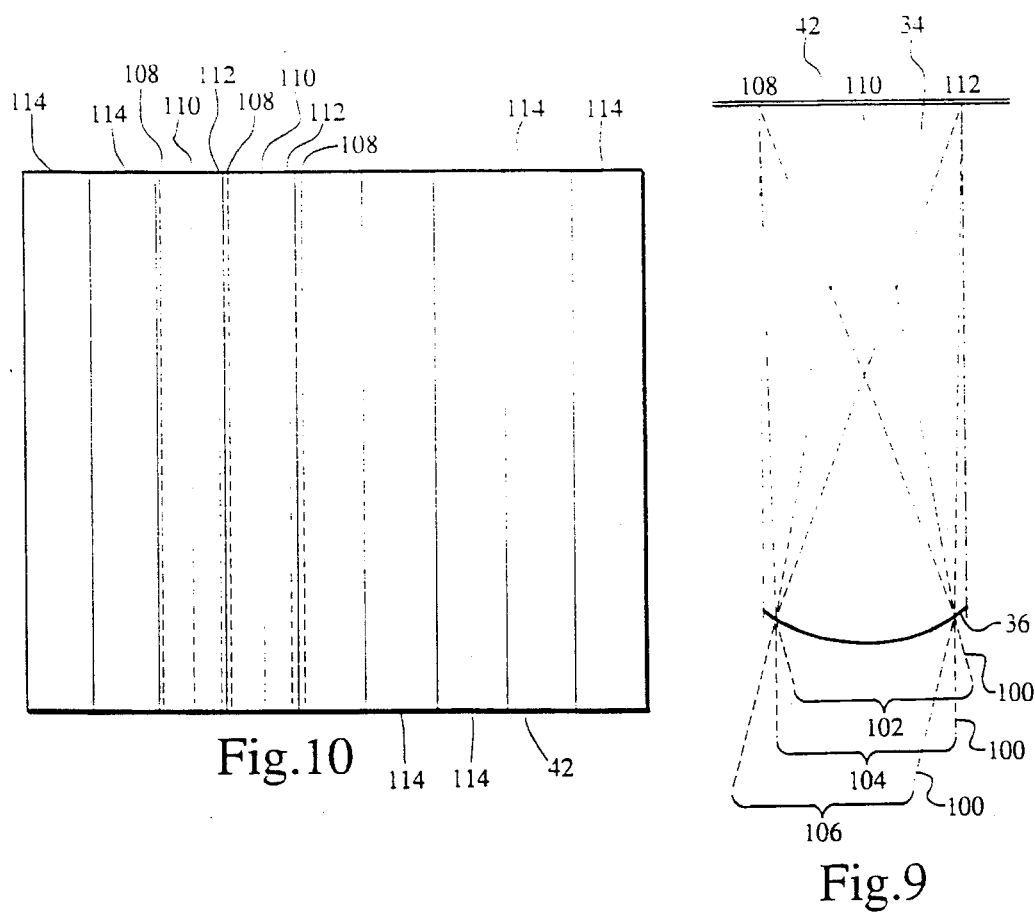
Fig.10
Fig.9

PARALLEL RAYS FROM PROJECTED IMAGE

METHOD AND APPARATUS FOR CREATING CYLINDRICAL THREE DIMENSIONAL PICTURE

CROSS-REFERENCE TO RELATED APPLICATION

This application is a continuation-in-part of U.S. patent application Ser. No. 08/002,969, filed Jan. 11, 1993, now U.S. Pat. No. 5,365,294.

TECHNICAL FIELD

This Invention relates to a method and apparatus for producing a three dimensional picture and, more particularly, to a method and apparatus for producing a cylindrical 3D picture capable of being viewed through an angle of 360°.

BACKGROUND OF THE INVENTION

Since the birth of photography, photographers and viewers have strived to make pictures more realistic by creating three dimensional images. This has lead to the development of a wide range of methods and equipment for recording and viewing three dimensional images. Such methods included the viewing of the images through special lenses, such as 3D glasses for the individual viewer; the creation of images on a flat surface through use of concentric circular lenses in conjunction with line screens having alternate opaque and transparent vertical lines; creating three dimensional images through use of a plurality of angularly spaced mirrors; viewing images through rapidly moving screens having spaced-apart openings; viewing a television screen through a series of vertically extending cylindrical lenses mounted to the television screen between the viewer and the television screen; and rapidly rotating a screen displaying a fast changing series of images generated by an external projector rotating synchronously with the screen.

Although prior art 3D images appeared to have depth, none of the prior methods of creating and viewing 3D figures have resulted in the creation of a three dimensional fixed image that can be viewed through an angle of 360°.

SUMMARY OF THE INVENTION

The 3D picture and the method and apparatus for creating the 3D picture of the present invention overcome the foregoing limitations associated with creation and viewing of three dimensional images by creating a cylindrical 3D picture which may be viewed through an angle of 360°, such that the image of a photographed subject appears to be encased within a viewing cylinder. The cylinder on which the 3D picture is mounted for viewing may be of any circumference. Surrounding the exterior of the cylinder is a photograph containing multiple, sequential, images of the subject, in turn surrounded by a lenticular lens through which the photograph is viewed. Although in the present embodiment of the invention, a cylindrical substrate is used to support the lenticular lens and underlying photograph, other geometric shapes may be used to achieve the desired result.

In another embodiment of the invention, the cylindrical or other geometrically shaped support has a lenticulated outer surface with the photograph placed inside the support such that the photograph is viewed through the lenticulated surface of the support. Thus, the support functions as the viewing lens as well.

To produce the three dimensional images, a multiple imaging camera is positioned to take multiple, sequential images of a subject as the subject is rotated 360°, creating a first sequential film strip depicting the subject from all angles of rotation. The images of the first film strip are then projected sequentially frame-by-frame through the lenticular lens and onto a second film strip surrounding an exposure cylinder as the cylinder is rotated 360°. The exposure cylinder is enclosed within a housing having a vertical aperture for exposing the second film strip as the exposure cylinder is rotated within the housing. The aperture has a width equal to the subtended chord of the lobe angle of the lenticular lens.

In a method for direct exposure of the film strip incorporating a second embodiment method of the present invention, the rotating subject is photographed with a conventional viewing camera modified by replacing the film holder with an exposure cylinder mounted within the camera housing. A film strip is mounted onto the cylinder and surrounded by a lenticular lens. The vertical aperture is in alignment with the camera aperture for exposing the film through the lenticular lens. As the rotating subject is photographed, the exposure cylinder rotates within the housing at a rate of speed equal to the rate of rotation of the subject, thereby exposing the film strip through the lenticular lens as the exposure cylinder rotates past the aperture.

In a method for linear exposure of the film strip incorporating a third embodiment method of the present invention, a film strip and a lenticular lens, both equal in width to the circumference of the desired viewing cylinder, are mounted onto a vacuum film holder positioned for linear movement along a track in a light tight housing, a housing sealed to prohibit penetration of light except through an appropriate aperture. The film strip is exposed through the lens as the vacuum film holder moves along the track past an aperture in the housing.

Once exposed through the lenticular lens, the film strip is processed and the resulting photograph mounted surrounding a viewing cylinder having the same circumference as the exposure cylinder or same width as the linearly exposed film strip. A lenticular lens surrounds the photograph to create an illusion when viewed by an observer of a 3D image of the subject being reduced in size and encased within the cylinder.

In production, the lenticular lens and second film strip consist of a film strip separate from the lenticular lens, or a unitary strip having the lenticular lenses extending transversely across the width of the film strip on one side with the photo emulsion bonded to a second side of the film strip opposite the lenticular lenses. The unitary strip is unwound from a first film canister, and is rotated around the exposure cylinder for sequential exposure of the entire length of film to a continuously repeated series of 3D images, and subsequently wound onto a second film canister where the film is stored until it is processed. Once the lenticular film strip has been processed, each repeated series of images photographed is cut into a separate length equal to the circumference of the exposure/viewing cylinder. Thus, many separate cylindrical three dimensional pictures may be produced continually from a length of the unitary lenticular film strip.

The lenticular surface of the unitary film strip is formed by rotating a continuous length of plastic film base material, coated on one side with an ultraviolet polymer, over the surface of a negative lenticulated cylinder while exposing the base material to an ultraviolet light source, creating the ribbed surface of the lenticular strip. The lenticular strip is then coated on the side opposite the textured surface with the desired photo emulsion, thereby creating a unitary film strip having a lenticulated surface through which the photo emulsion is later exposed to the projected multiple images.

In yet another embodiment of the present invention, surrounding the exterior of the cylinder is a photograph containing multiple, sequential, images of the subject, in turn surrounded by a parallax barrier strip (black line screen) through which the photograph is viewed to provide a 3D image of the subject. In this embodiment, the film strip is first exposed to the series of images through a parallax barrier strip which functions as a lenticular pin hole.

BRIEF DESCRIPTION OF THE DRAWINGS

For a more complete understanding of the present invention and the advantages thereof, reference is now made to the following Detailed Description taken in conjunction with the accompanying Drawings in which:

FIG. 8 is a partial cross section of the lenticular lens of FIG. 6 illustrating the calculation of the lens lobe angle;

FIG. 9 is a diagrammatic cross section of an individual lenticular of the lenticular lens of FIG. 6, illustrating representative angles of exposure of the film strip with respect to each individual lenticular;

FIG. 10 is a front view of the film strip illustrating the areas of exposure in relation to individual lenticulars of the lenticular lens;

DETAILED DESCRIPTION

Figures 1, 2, 3:
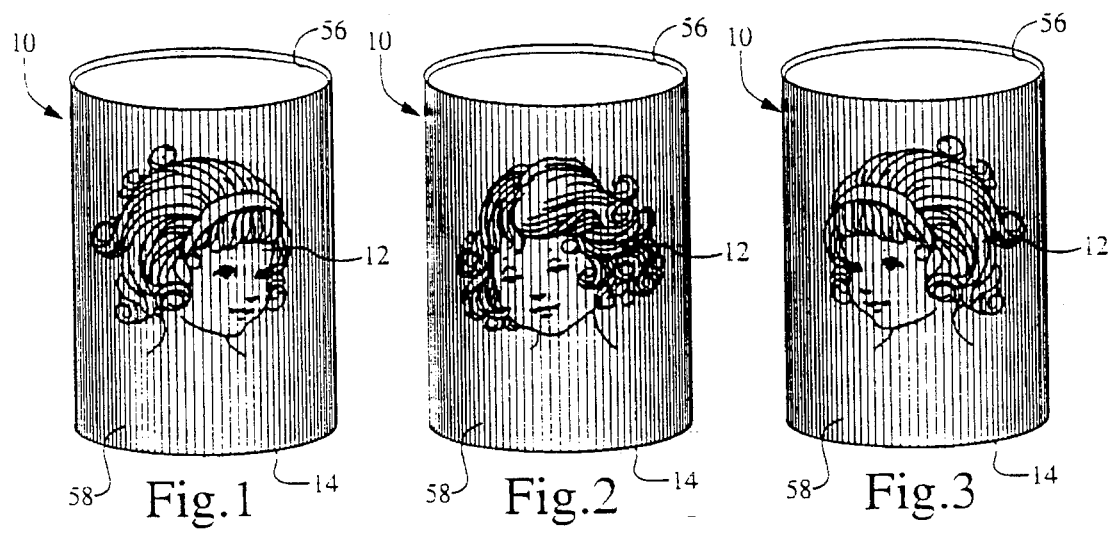
FIG. 1 is a side view of a cylindrical three dimensional picture produced in accordance with the present invention.
FIG. 2 is a front view of the cylindrical 3D picture of FIG. 1.
FIG. 3 is a view of the cylindrical 3D picture of FIG. 1 as seen from a third angle.

Referring now to the Drawings and more particularly to FIGS. 1, 2 and 3, there is shown a cylindrical three dimensional picture 10 capable of being viewed through an angle of 360°. As the picture 10 is rotated by the viewer, such that it is viewed from a variety of different angles three of which are represented in FIGS. 1, 2 and 3, the subject 12 appears in three dimensions to be encased within a viewing cylinder 14.

Figure 4:
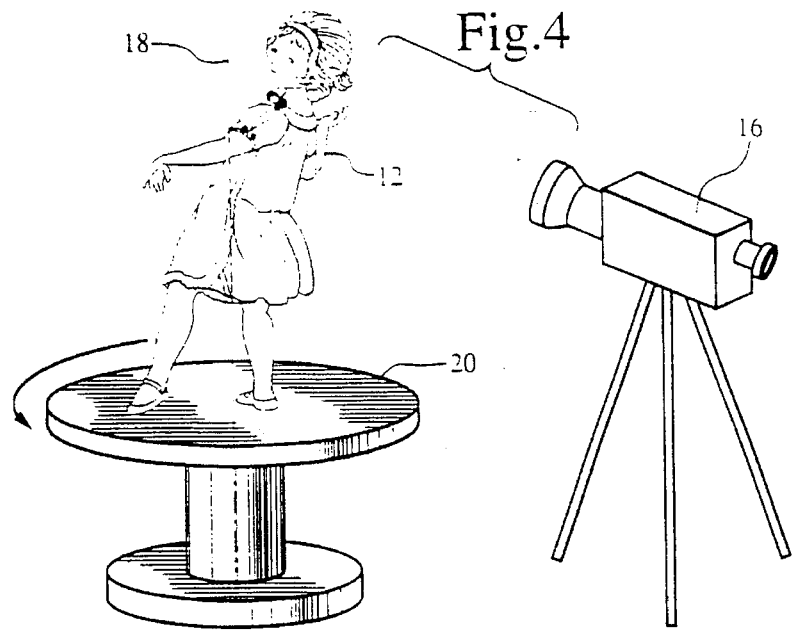
FIG. 4 is a drawing illustrating the manner in which the subject of the cylindrical 3D picture of FIG. 1 is photographed as the subject rotates through a 360° angle in an indirect exposure method incorporating a first embodiment method of the present invention and a direct exposure method incorporating a second embodiment method of the present invention.
Figure 5:
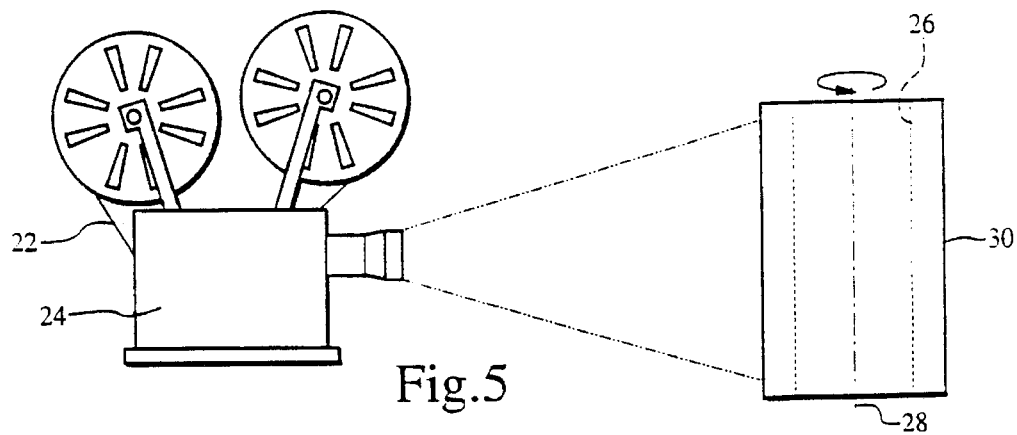
FIG. 5 is a drawing illustrating a method for exposing the images photographed in FIG. 4 through a lenticular lens onto a film strip surrounding a cylinder as the cylinder rotates 360° in the first embodiment method of the present invention.

Referring now to FIGS. 4 and 5, there is illustrated a first embodiment method for producing the cylindrical 3D picture of the present invention. To overcome the viewing angle limitations of prior art 3D pictures necessary to accomplish the cylindrical 3D picture of FIGS. 1, 2 and 3, in a first embodiment of the present invention, the subject 12 is repeatedly photographed with a camera 16 through 360° as the subject is rotated 360° on a turntable 20 positioned for rotational movement about a vertically extending axis 18. In the first embodiment of the invention, the camera 16 is preferably a multiple imaging camera. The sequential, multiple images of the subject photographed are preserved on film 22 (see, FIG. 5).

Figure 6:
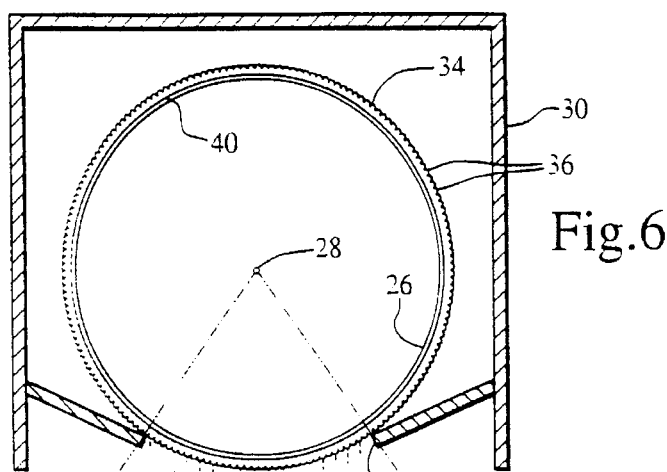
FIG. 6 is a section view of the cylinder of FIG. 5 within a housing having an aperture for exposing the film strip as illustrated in FIG. 5.

The images are then projected through a projection device 24 onto an exposure cylinder 26124, as the cylinder 26 rotates through an angle of 360° about a vertically extending axis 28. As illustrated in FIGS. 5 and 6, the exposure cylinder 26 is contained within a light tight housing 30 having an aperture 32 therein for projection of the multiple images from the film 22 onto the exposure cylinder 26 as it rotates adjacent the aperture 32.

Figure 7:
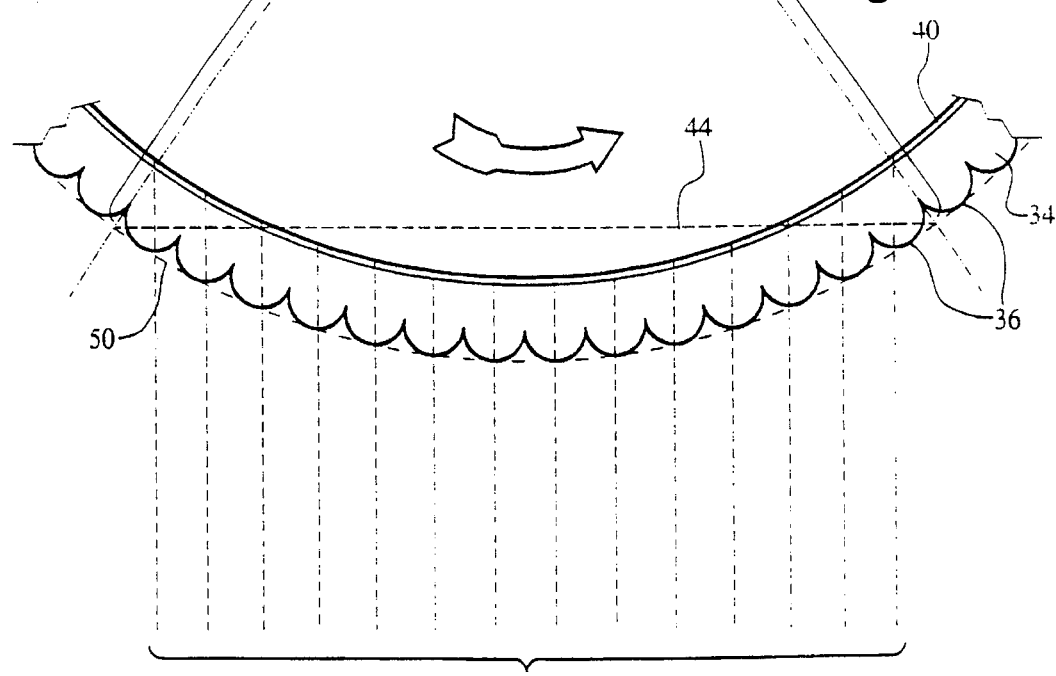
FIG. 7 is a partial top view of the cylinder of FIG. 6 illustrating the exposure of the lenticular film strip through the lenticular lens as the cylinder rotates.

Referring now to FIGS. 6 and 7, surrounding the exposure cylinder 26 is a lenticular lens 34 formed of a plurality of individual, semi-circular, vertically extending, parallel lenticulars 36 defining a first lenticulated surface and a second smooth surface 40 opposite the lenticulated surface containing the lenticular lenses. Surrounding the exposure cylinder 26 and facing outwardly toward the smooth surface 40 of the lenticular lens 34 is a photo emulsion or film layer 42. As the cylinder 26 rotates through an angle of 360° about the vertical axis 28, the film/emulsion layer 42 is exposed to sequential, multiple images as the cylinder 26 passes the aperture 32.

The width of the aperture 32 is equal to the subtended chord 44, FIG. 7, of the lens lobe angle 46, FIGS. 7 and 8. The lens lobe angle 46 is determined by the lens thickness and lens frequency or pitch. Although a variety of lobe angles may be used, in the preferred embodiment of the invention a lobe angle of 72° has been chosen because it represents the maximum angle for the sharpest exposure of the underlying film/emulsion layer 42.

Referring now to FIGS. 6, 7 & 8, the width 44 of the aperture 32 corresponds to the lens lobe angle 46, which is determined by the formula: Lobe angle $(\angle°)=2[\tan(0.5P/C)]$, where P (pitch)=1/L and L is the number of individual lenticulars 36 per inch. C=T−r, where T is the thickness of the lens 34 (FIG. 8) and is the product of the index of refraction for the particular lens material and the radius of curvature of the individual lenticular 36. For a lens made from polyvinyl chloride, for example, T=2.7 r; and for polystyrene, T=2.43 r.

The width 44 of the aperture 32 is equal to the subtended chord of the lens lobe angle 46, or $2[\sin(\text{Lobe}\angle°/2) R]$, where R (shown at 52) is the radius 54 of the desired cylinder plus T, the thickness of the lenticular lens 34.

Referring now to FIGS. 6, 9, and 10, as the exposure cylinder 26 rotates, the projection beam 100 strikes the surface of the individual lenticulars 36 formed in lens 34 from a series of representative angles as shown at 102, 104, and 106 (FIG. 9). As the projected beam 100 strikes the surface of the lenticulars 36, the rays are refracted and converge at focal points 108, 110, and 112 (FIG. 9), corresponding to the contact angles shown at 102, 104, and 106 (FIG. 9), respectively, exposing the film/emulsion layer 42.

As illustrated in FIG. 10, exposure of the film/emulsion layer 42, at focal points 108, 110, and 112 is repeated for each individual lenticular 36 represented by lines 114. It is understood that the film/emulsion layer 42 will be exposed along a multiplicity of focal points corresponding to angles of contact of the beam 100 through the lenticular lens 34, with focal points 108, 110, and 112 merely being representative for purposes of illustration of the present invention. Thus, each exposed lenticular 36 across the aperture 32 (FIG. 6) continues to record its share of the sequential images projected thereon as it travels from one side of the aperture 32 to the other, finally exposing the entire 360° of film/emulsion layer 42 surrounding the cylinder 26 (FIG. 6) as the rotation is completed.

Referring again to FIGS. 1 and 6, once exposed through the lenticular lens 34, the film/emulsion layer 42 is processed and the resulting photograph 56 mounted surrounding the viewing cylinder 14 having the same circumference as the exposure cylinder 26. A second lenticular lens 58 surrounds the photograph 56 to create an illusion of the subject 12 being reduced in size and encased as a three dimensional image within the viewing cylinder 14. Although in the preferred embodiment of the present invention, the photograph 56 is disposed between the viewing cylinder 14 and the lenticular lens 58, the lens 58 may itself be shaped to form the viewing cylinder 14, such that the photograph 56 is placed within the lens 58 for viewing without a separate cylinder 14. Likewise, although in the preferred embodiment of the present invention the viewing substrate is cylindrical in shape, other geometrical shapes may be used.

Referring again to FIGS. 4 and 6, there is illustrated a method for direct exposure of the film/emulsion layer 42, incorporating a third embodiment method for producing the cylindrical 3D picture 10 of the present invention. In the direct exposure method, the camera 16 is a conventional viewing camera modified by replacing the film holder with the housing 30 and exposure cylinder 26 mounted therein. The film/emulsion layer 42 is mounted onto the cylinder 26 and surrounded by the lenticular lens 34. The vertical aperture 32 is in alignment with the camera 16 aperture for exposing the film/emulsion layer 42 through the lenticular lens 34. As the rotating subject 12 is photographed, the exposure cylinder 26 rotates within the housing 30 at a rate of speed equal to the rate of rotation of the subject 12, thereby directly exposing the film/emulsion layer 42 to sequential images of the subject 12 through the lenticular lens 34 as the exposure cylinder 26 rotates past the aperture 32.

Figure 11:
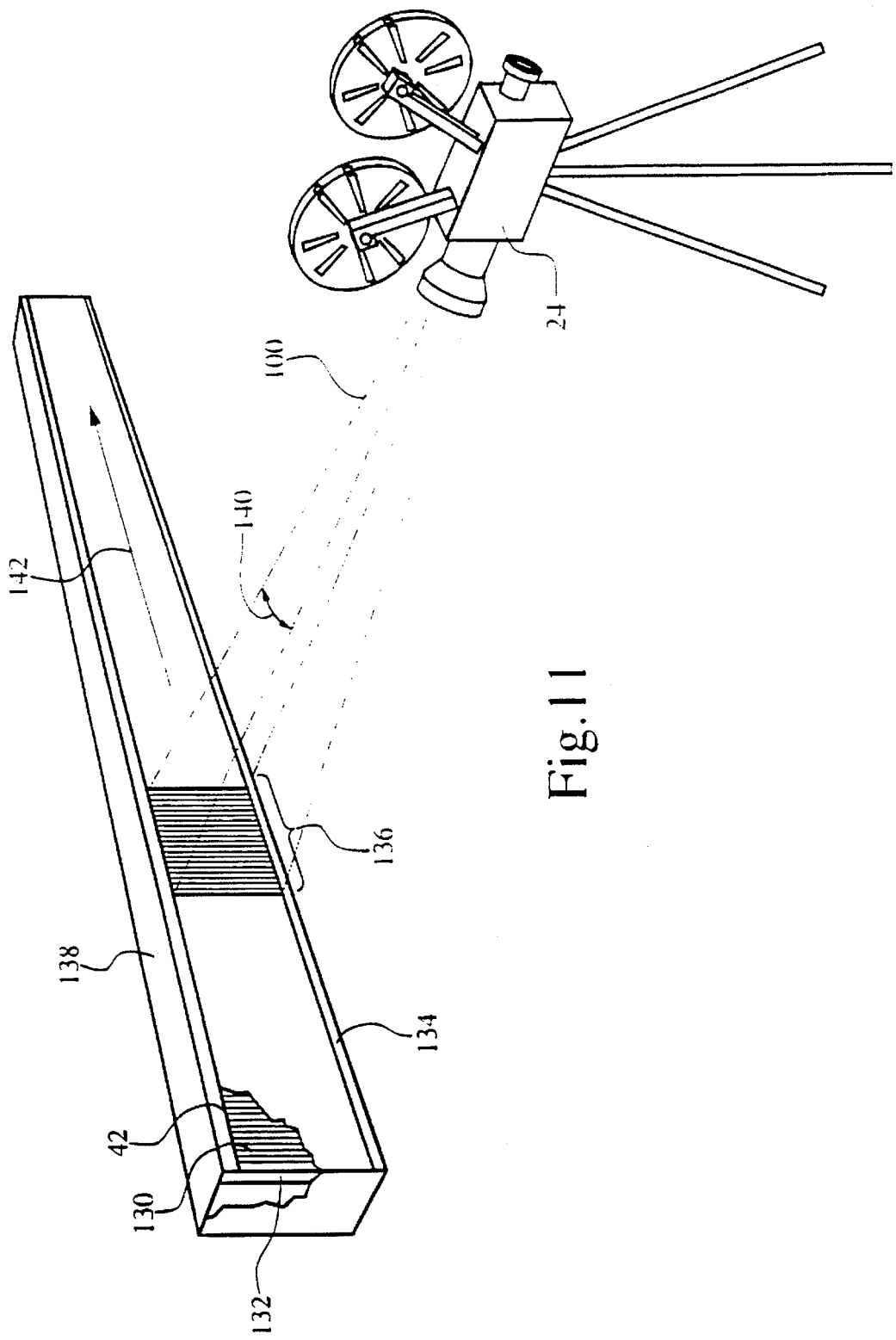
FIG. 11 is a drawing illustrating a linear method for exposing the film strip through a lenticular lens incorporating a third embodiment method of the present invention.

Referring now to FIG. 11, there is illustrated a linear method for exposing the film/emulsion layer 42 through a lenticular lens 130, incorporating a third embodiment method for producing the cylindrical 3D picture 10 of the present invention. Equal widths of film/emulsion layer 42 and the lenticular lens 130, representing the circumference of the desired viewing cylinder, are mounted onto a vacuum film holder 132 for linear movement along a track 134 mounted within a light tight enclosure 138. The light tight enclosure 138 has an exposing aperture 136 between the vacuum film holder 132 and the projection device 24. As the vacuum film holder 132 and film 42 and lens 130 mounted thereon move linearly in the direction indicated by arrow 142 along the track 134 within the enclosure 138, the film 42 is exposed by the beam 100 through the lens 130 as the film holder 132, film 42, and lens 130 pass the aperture 136.

Referring now to FIGS. 9 and 11, the representative contact angles 102, 104, and 106 (FIG. 9) of the image beam 100 projected from the projection device 24 are achieved through linear movement of the lenticular lens 130 across the projected image beam 100. In the preferred embodiment of the invention, the length of the vacuum film holder 132 is equal to the circumference of the proposed viewing cylinder 14. As with the first embodiment method for making the cylindrical 3D picture 10, the aperture 136 through which the film 42 is exposed is equal in width to the subtended chord of the lens lobe angle, where the projection angle 140 is equal to the lens lobe angle, and the length of the subtended chord is determined by the distance of the projection device 24 from the lens surface.

It has been determined that a lens lobe angle of 20° produces a 3D image of suitable resolution when the film is exposed linearly. Due to the narrow lens lobe angle, linear exposure requires exposure of the film/emulsion layer 42 to multiple images of the subject photographed through a full 360° angle of rotation, plus an additional one-fifth of the rotation to expose a length of film/emulsion layer 42 equal to the circumference of the viewing cylinder 14.

Figure 12:
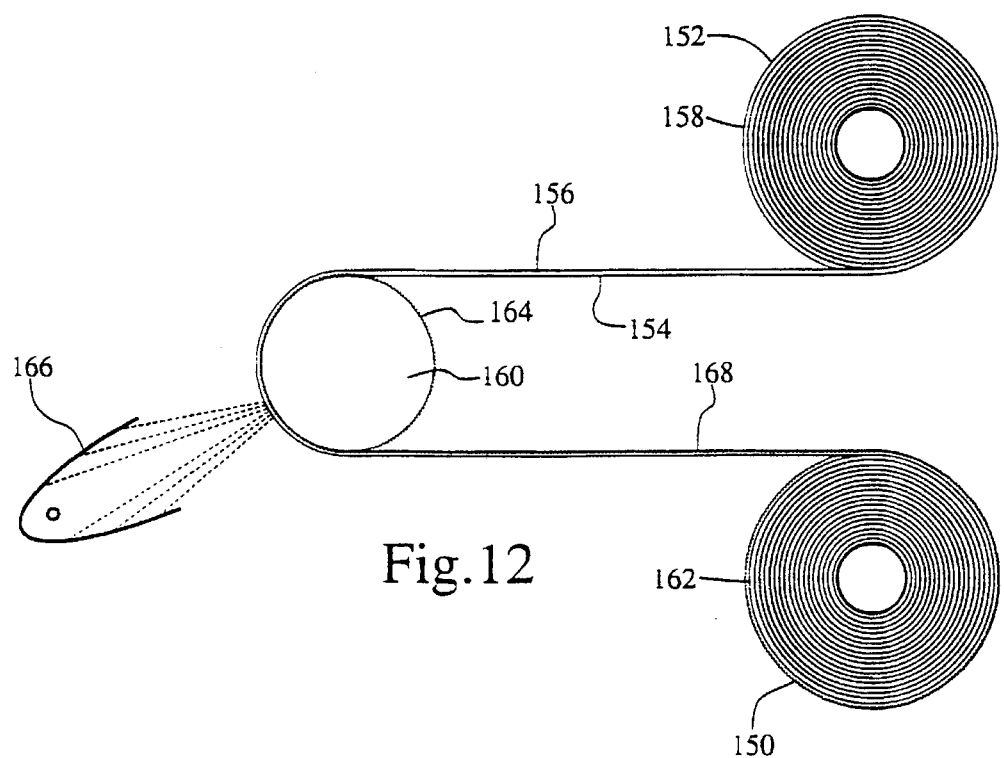
FIG. 12 is a drawing illustrating the formation of a unitary lenticular film strip.

Referring now to FIG. 12, a unitary lenticular lens film strip 150 may be substituted for the separate lenticular lens 34 and associated film/emulsion layer 42. A plastic film base material 152 having a first side 154 and a second side 156 is coated on the first side 154 with an ultraviolet polymer. The base material 152 is wound from a first film canister 158 over a negative lenticulated cylinder 160 and onto a second film canister 162. Adjacent, vertically extending parallel indentions 164 cover the surface of the negative lenticulated cylinder 160 and correspond to the curvature of a desired lenticular lens.

As the coated base material 152 passes over the negative lenticulated cylinder 160, it is exposed to an ultraviolet light source 166, which cures and solidifies the coating creating the lenses on the first side 154 of the base material 152 corresponding to the indentions 164 in the surface of the negative lenticulated cylinder 160. The resulting lenticular lens film strip 168, is wound onto the second film canister 162 from the negative lenticulated cylinder 160.

Figure 13:
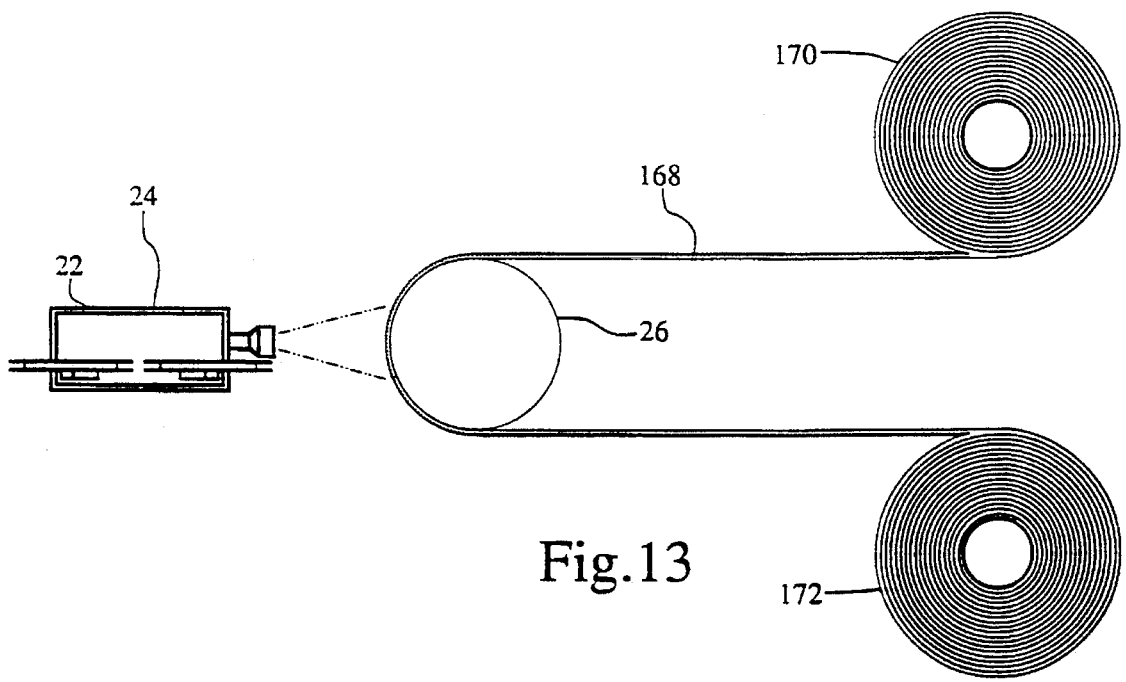
FIG. 13 is a drawing illustrating the exposure of the unitary lenticular film strip of FIG. 12.

Referring now to FIG. 13, the lenticular lens film strip 168 is coated on the second side 156 with a photo emulsion and wound onto a third light tight film canister 170 for storage and subsequent use in making the cylindrical 3D picture 10 of the present invention. When exposing the lenticular lens film strip 168, sequential images from the multiple image film 22 are projected by the projection device 24 onto the lens film strip 168 as it rotates around the exposure cylinder 26. The multiple image film strip 22 is a continuous loop such that the series of sequential multiple images taken of the subject as it rotates 360° is repeatedly projected onto the lens film strip 168, with an exposure of one complete series equal in length to the circumference of the viewing cylinder 14.

The exposed lens film strip 168 is then wound on a fourth film canister 172 for storage and subsequent developing of the film 168. Upon developing the lens film strip 168, the resultant photographs of the repeated series of sequential, multiple images are separated by cutting the photographs produced from the film strip 168 into lengths equal to the circumference of the viewing cylinder 14. Each segment is then mounted to a viewing cylinder or is cylinderized separately without a cylinder, thereby producing a plurality of cylindrical 3D pictures 10. The use of the unitary lens film strip 168 alleviates blurring or fuzzy images as a result of improper alignment between a separate flexible lenticular lens and underlying photograph when mounted on the viewing cylinder, and allows production of multiple copies of the 3D picture 10 at one time.

Figure 14:
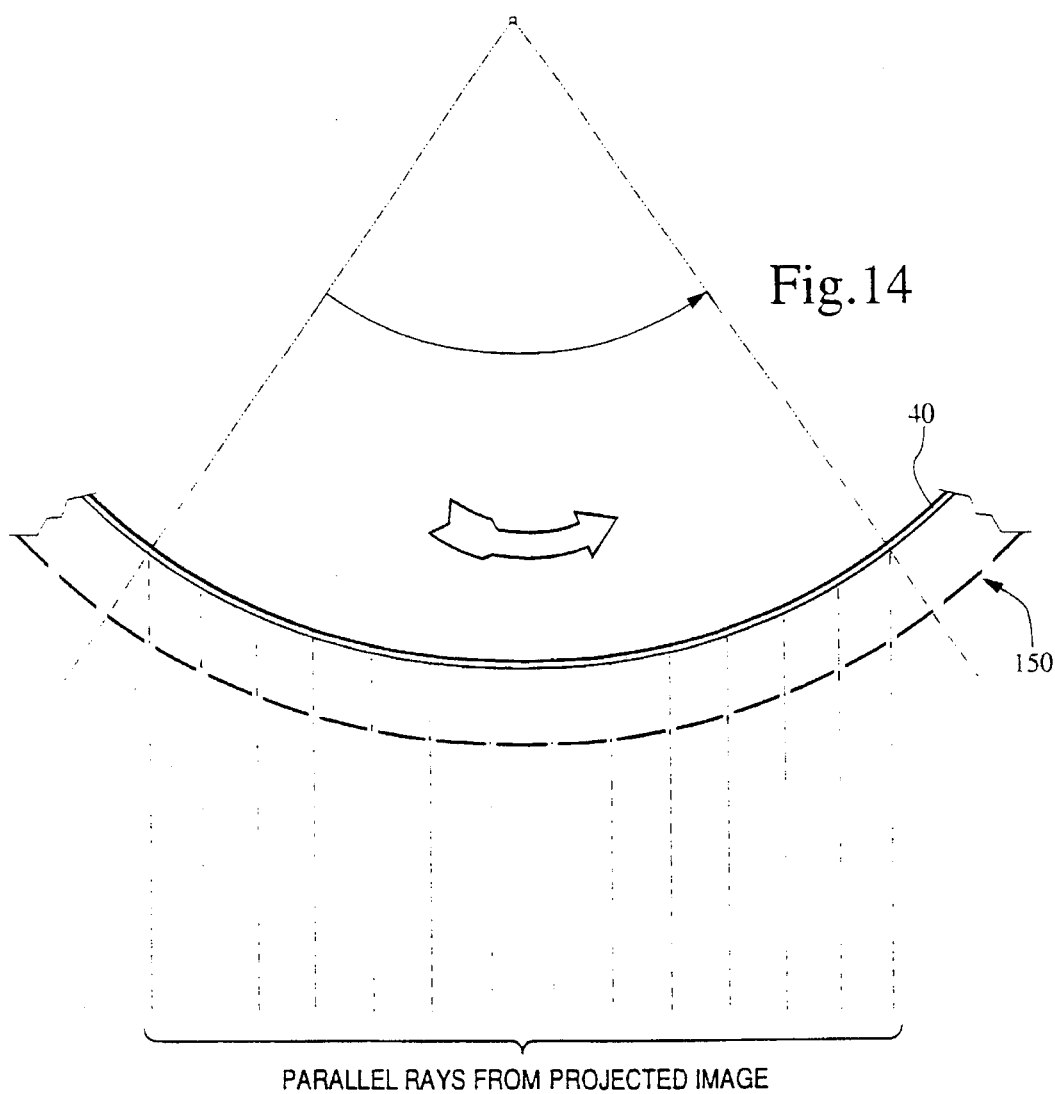
FIG. 14 shows a modified view of FIG. 7 incorporating a parallax barrier strip in place of the lenticular lens.
Figure 15:
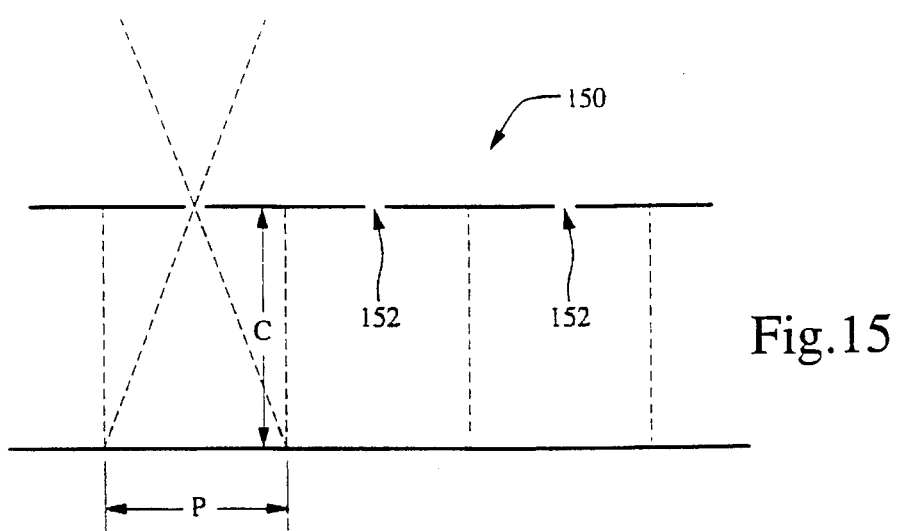
FIG. 15 shows a modified view of FIG. 8 incorporating a parallax barrier strip in place of the lenticular lens.

Referring now to FIGS. 14 and 15, there is illustrated a parallax barrier strip 150 (black line screen) substituted for the lenticular lens 34 shown in FIGS. 7 and 8. The barrier strip 150 acts as a "pin hole" lenticular when the linear slot opening 152 of the strip is positioned in the same location as the center of the lenticular arc (compare with FIGS. 7 and 8). The equations for calculating the positioned characteristics of the barrier strip 150 are the same as those described above with respect to the lenticular lenses for both the barrier pitch "P" and the screen thickness "C". The processes disclosed above may also be used with a barrier strip 150 as opposed to a lenticular lens in the formation of three dimensional images. The advantages of using a barrier strip 150 over a lenticular lens system are reduced manufacturing expense and wider image resolution angle. One trade off, however, of the barrier strip 150 system is that greater light intensity is needed for both recording the image on the film 42 and viewing the image on the substrate.

Although preferred embodiments of the present invention have been illustrated in the accompanying Drawings and described in the foregoing Detailed Description, it is to be understood that the same is by way of illustration and example only and is not to be taken by way of limitation, the spirit and scope of the invention being limited only to the terms of the appended claims.

I claim:

1. A three dimensional picture viewable by an observer through an angle of 360° comprising:

a photograph containing a series of images resulting from a photo emulsion exposed from various angles to a series of sequential images of a subject photographed through an angle of 360°; and a parallax barrier strip disposed between the photograph and the observer to permit the photograph to be viewed as a three dimensional image of the subject through an angle of 360°.

2. The three dimensional picture of claim 1, further comprising a substrate for supporting the photograph and the parallax barrier strip.

3. The three dimensional picture of claim 2, wherein the substrate has a generally cylindrical shape.

4. The three dimensional picture of claim 1, wherein the parallax barrier strip comprises a plurality of parallel linear slots through which certain images recorded on the photograph are viewed through parallel slots as a three dimensional image of the subject.

5. Apparatus for producing a picture of a subject having an image viewable in three dimensions through an angle of 360° comprising:

means for rotating a subject to be photographed about a vertically extending axis through an angle of 360°;

camera means for sequentially photographing the subject at various angles as the subject rotates through an angle of 360° to produce a series of sequential images recorded on a photo emulsion; and a parallax barrier strip disposed between the subject and the photo emulsion for controlling exposure of the photo emulsion to the series of images.

6. The apparatus for producing a picture of claim 5, further comprising:

a viewing substrate for mounting a photograph developed from the exposed photo emulsion; and another parallax barrier strip positioned over the mounted photograph for viewing the photograph as a three dimensional image of the subject through an angle of 360°.

7. The apparatus for producing a three dimensional picture of claim 5, wherein the camera means further comprises a photo emulsion exposure cylinder mounted for rotation about a vertically extending axis, the cylinder rotating through an angle of 360° as the subject rotates exposing the photo emulsion through the parallax barrier strip.

8. A method for creating a three dimensional picture viewable through an angle of 360°, comprising the steps of:

sequentially photographing a subject at a series of angles as the subject rotates through an angle of 360° to produce a series of sequential images;

exposing a photo emulsion to the series of sequential images through a parallax barrier strip;

developing the exposed photo emulsion; and disposing a second parallax barrier strip between an observer and the developed photo emulsion for viewing of the series of sequential images as a three dimensional image of the photographed subject.

9. The method for producing a three dimensional picture of claim 8, further comprising the step of mounting the resulting photograph on a supporting substrate.

10. The method for producing a three dimensional picture of claim 8, further comprising the step of mounting the parallax barrier strip and the photo emulsion on and surrounding an exposure cylinder.

11. The method for producing a three dimensional picture of claim 10, further comprising the steps of:

mounting the exposure cylinder for rotation about a vertically extending axis; and rotating the exposure cylinder during exposure through an angle of 360° as the subject is sequentially photographed through an angle of 360°.

12. The method for producing a three dimensional picture of claim 8, further comprising the step of moving the parallax barrier strip and the photo emulsion linearly in relation to a projected beam of the sequential images, projecting the images through the parallax barrier strip.

13. A method for creating a three dimensional picture viewable through an angle of 360°, comprising the steps of:

sequentially photographing a subject at a series of angles as the subject rotates through an angle of 360° to produce a series of sequential images;

exposing the surface of a photo emulsion to the series of images through a first parallax barrier strip to develop a photograph; and disposing a second parallax barrier strip between an observer and the photograph for viewing of the series of images as a three dimensional image of the photographed subject.

14. The method for producing a three dimensional picture of claim 13, further comprising the step of mounting the photograph on a supporting substrate.

15. The method for producing a three dimensional picture of claim 13, further comprising the step of mounting the first parallax barrier strip and the photo emulsion on and surrounding an exposure cylinder.

16. The method for producing a three dimensional picture of claim 15, further comprising the steps of:

mounting the exposure cylinder about a vertically extending axis; and rotating the exposure cylinder through an angle of 360° corresponding with the photographing of the subject through an angle of 360° as the photo emulsion is exposed to the series of images.

17. Apparatus, comprising:

a photograph containing an ordered sequence of images of a subject;

a cylinder having an axis and an outer surface about which the photograph is wrapped; and a means wrapped over the cylindrically wrapped photograph for allowing only certain ones of the images contained in the photograph to viewed at one time as the cylinder is rotated about its axis to reveal the sequence of images in order.

18. The apparatus as in claim 17 wherein the means for allowing comprises a parallax barrier strip.

19. The apparatus as in claim 17 wherein the means for allowing comprises a plurality of parallel lenticular lenses.

* * * * *